United States Patent
Teranishi et al.

(10) Patent No.: US 9,458,047 B2
(45) Date of Patent: Oct. 4, 2016

(54) METHOD FOR CUTTING PLATE-LIKE GLASS, AND CUTTING DEVICE THEREFOR

(75) Inventors: Yasuo Teranishi, Shiga (JP); Yasuhiro Matsumoto, Shiga (JP); Taiki Minari, Shiga (JP); Takaya Furuta, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 353 days.

(21) Appl. No.: 14/007,018

(22) PCT Filed: Jun. 7, 2011

(86) PCT No.: PCT/JP2011/062995
§ 371 (c)(1),
(2), (4) Date: Sep. 24, 2013

(87) PCT Pub. No.: WO2012/169002
PCT Pub. Date: Dec. 13, 2012

(65) Prior Publication Data
US 2014/0017475 A1    Jan. 16, 2014

(51) Int. Cl.
*C03B 33/02* (2006.01)
*C03B 33/023* (2006.01)
*C03B 33/09* (2006.01)
*C03B 33/07* (2006.01)

(52) U.S. Cl.
CPC ............ *C03B 33/02* (2013.01); *C03B 33/0215* (2013.01); *C03B 33/0235* (2013.01); *C03B 33/091* (2013.01); *B65G 2249/04* (2013.01); *C03B 33/074* (2013.01); *Y02P 40/57* (2015.11); *Y10T 83/0414* (2015.04); *Y10T 83/283* (2015.04)

(58) Field of Classification Search
None
See application file for complete search history.

(56) References Cited

U.S. PATENT DOCUMENTS

| 3,543,979 | A | * | 12/1970 | Hamer | ................... C03B 33/023 |
|---|---|---|---|---|---|
| | | | | | 219/121.67 |
| 5,776,220 | A | * | 7/1998 | Allaire | ............... B23K 26/0736 |
| | | | | | 219/121.6 |
| 2006/0081101 | A1 | | 4/2006 | Hayashi et al. | |
| 2010/0107848 | A1 | * | 5/2010 | Joseph, II | ............... C03B 21/04 |
| | | | | | 83/862 |
| 2010/0212361 | A1 | * | 8/2010 | Abramov | ............ C03B 33/0215 |
| | | | | | 65/105 |

(Continued)

FOREIGN PATENT DOCUMENTS

| CN | 102076579 | | 5/2011 | |
| GB | 338778 | A * | 11/1930 | ......... C03B 33/0215 |

(Continued)

OTHER PUBLICATIONS

Machine translation of JP 2005/263578 A, obtained from Industrial Property Digital Library of the JPO on Nov. 25, 2015.*

(Continued)

*Primary Examiner* — Lisa Herring
(74) *Attorney, Agent, or Firm* — Wenderoth, Lind & Ponack, L.L.P.

(57) ABSTRACT

Provided is a method of cutting a glass sheet (G) by performing at least localized heating along a preset cutting line (5) of the glass sheet (G), the method comprising cutting a full body of the glass sheet (G) by performing at least the localized heating along the preset cutting line (5) of the glass sheet (G) under a state in which support members (2 (8)) for supporting, from a back surface side of the glass sheet (G), portions of the glass sheet (G) that are situated apart from the preset cutting line (5) toward both sides thereof are arranged apart from each other so as to form a space (S) on the back surface side of the preset cutting line (8).

10 Claims, 7 Drawing Sheets

(56) References Cited

U.S. PATENT DOCUMENTS

2011/0177325 A1* 7/2011 Tomamoto ............ B65H 18/28
  428/332
2011/0200812 A1 8/2011 Tomamoto et al.

FOREIGN PATENT DOCUMENTS

| JP | 02-030390 | 1/1990 | | |
|---|---|---|---|---|
| JP | 07-068395 | 3/1995 | | |
| JP | 8-174260 | 7/1996 | | |
| JP | EP 0903327 A2 * | 3/1999 | ............ | C03B 33/09 |
| JP | 2004-505881 | 2/2004 | | |
| JP | 2005-263578 | 9/2005 | | |
| JP | 2005263578 A * | 9/2005 | | |
| JP | 2006-131490 | 5/2006 | | |
| JP | 2006-199553 | 8/2006 | | |
| JP | 2009-040665 | 2/2009 | | |
| JP | WO 2010038758 A1 * | 4/2010 | ............ | B65H 18/28 |
| JP | 2010-132531 | 6/2010 | | |
| WO | 02/14229 | 2/2002 | | |

OTHER PUBLICATIONS

Chinese Office Action issued Oct. 21, 2015 in corresponding Chinese Patent Application No. 201180067094.9 with English Translation.
Chinese Office Action issued Feb. 28, 2015 in corresponding Chinese Patent Application No. 201180067094.9 with English Translation.
International Search Report mailed Sep. 13, 2011 in International (PCT) Application No. PCT/JP2011/062995.
International Preliminary Report on Patentability and Written Opinion of the International Searching Authority issued Dec. 27, 2013 in International (PCT) Application No. PCT/JP2011/062995.

* cited by examiner

METHOD FOR CUTTING PLATE-LIKE GLASS, AND CUTTING DEVICE THEREFOR

TECHNICAL FIELD

The present invention relates to a method and apparatus for cutting a glass sheet by performing at least localized heating along a preset cutting line of the glass sheet.

BACKGROUND ART

As is well known, flat panel displays (FPDs) have become a mainstream of image display devices in recent years, the FPDs being typified by a liquid crystal display (LCD), a plasma display (PDP), a field emission display (FED), an organic light-emitting diode display (OLED), and the like. Progress is being made toward reducing the weight of those FPDs, and hence glass substrates used for the FPDs are also currently becoming thinner.

Further, there is a growing use of an organic light-emitting diode as a plane light source, such as a backlight of LCD and a light source for interior illumination, which emits only monochrome (for example, white) light, unlike a display that uses TFTs to blink light of three fine primary colors. Further, when an illumination device that uses the organic light-emitting diode includes a glass substrate having flexibility, a light-emitting surface is freely deformable. Therefore, from the viewpoint of ensuring sufficient flexibility, there is also promoted further thinning of the glass substrate (forming the glass substrate into a glass film) to be used for the illumination device.

In general, a method of cutting the glass substrate to be used for those FPDs and illumination devices involves a scribing step of forming a scribe having a predetermined depth in a front surface or a back surface of the glass substrate, followed by a breaking step of separating the glass substrate by applying a bending moment across the scribe line.

As an example of improvement for this type of glass substrate separating method, Patent Literature 1 discloses the following method. Specifically, an initial crack is formed at an end portion on a bottom surface of the glass substrate, and a heating unit for locally heating the glass substrate and a cooling unit for cooling the heated region scan the bottom surface of the glass substrate to form a scribe line extending from the initial crack. In a subsequent step, rollers that roll on the glass substrate sandwiched therebetween separate the glass substrate with the scribe line defined as a boundary.

Further, Patent Literature 2 discloses such a full-body cleaving method that thermal stress cleaving for a workpiece made of a brittle material (for example, glass substrate to be used for FPDs) is performed in separate steps that involve distribution of a thermal stress and propagation of a crack at a speed corresponding to a stress propagation rate as an upper limit, and a temperature distribution is formed by combining the heating through laser beam irradiation and the cooling through thermal conduction.

CITATION LIST

Patent Literature 1: JP 2006-199553 A
Patent Literature 2: JP 2009-40665 A

SUMMARY OF INVENTION

Technical Problems

By the way, in the glass substrate cleaving method disclosed in Patent Literature 1, a first stage and a second stage each having an upper surface serving as a suction surface are installed so as to be movable close to and apart from each other. Further, the glass substrate is placed in a manner of bridging the upper surfaces of both the stages, and the initial crack formation, the laser beam irradiation, and the cooling water jetting are performed on the preset cleaving line of the glass substrate.

In the glass substrate cleaving method disclosed in Patent Literature 1, however, similarly to the general methods, the scribe is formed in the bottom surface of the glass substrate, and so-called snapping is performed with the scribe defined as a boundary. Therefore, microcracks and the like are generated in a cleaved end surface, resulting in a drawback of deterioration in surface property of the cleaved end surface. In addition, this cleaving method requires three steps, specifically, the initial crack forming step, the scribe line propagating step, and the snapping step, and hence the cleaving work becomes troublesome and the apparatus becomes complicated, thus leading to critical problems such as decrease in productivity and increase in cost. Further, when continuously cleaving a band-like glass sheet that is delivered continuously, this cleaving method has a drawback of forcing extremely difficult work to be carried out.

In the cleaving method disclosed in Patent Literature 2, on the other hand, only the two steps, specifically, the step of forming an initial crack and the step of propagating the initial crack due to a thermal stress to cut the full body of the glass substrate need to be executed so as to complete the cleaving of the glass substrate, and hence higher-speed cleaving work can be expected. In addition, the cleaved end surface can be formed into a mirror-finished surface or a surface having surface property equivalent thereto, and hence an appropriate cleaved end surface can be expected. However, this literature does not disclose or suggest any specific manner of supporting the glass substrate, thus lacking details of the method for performing appropriate full-body thermal stress cleaving.

That is, in order to securely perform appropriate full-body thermal stress cleaving, the manner of supporting the glass substrate is an extremely important factor. In a conventional technology, however, as illustrated in FIG. 11a, in general, a glass substrate g is placed on an upper surface of a surface plate 20, and as indicated by the arrow "z", the localized heating through use of the laser or the like and the cooling of the heated region through use of the cooling water or the like are performed from the top of the glass substrate g, to thereby propagate the initial crack. Note that, this method has conventionally been carried out by the inventors of the present invention for a long period of time, and has never been disclosed in a publication or the like.

In such a simple method, however, the following situation arises. Specifically, when the localized heating is performed on the glass substrate g, as illustrated in FIG. 11b, a heated portion ga of the glass substrate g expands to project upward, and when the cooling is then performed on the glass substrate g, on the other hand, as illustrated in FIG. 11c, a cooled portion gb of the glass substrate g contracts to be depressed. Further, when the depressed portion gb is generated along with the cooling in the glass substrate g at a position on the surface plate 20, there arises such a situation that the initial crack propagates in a meandering manner or in an improper direction due to interference from the surface plate 20, resulting in a problem in that the glass substrate g is not cleaved accurately along the preset cleaving line. In addition, the glass substrate g is brought into surface contact or substantially brought into surface contact with the surface plate 20, and hence the heat is absorbed into the surface plate 20 to hinder sufficient localized heating. Even when the cooling is performed in this state, the temperature gradient is insufficient to deteriorate the thermal efficiency. As a result, there arises a trouble of still hindering the accurate cleaving along the preset cleaving line. The above-mentioned situations are remarkable when the glass substrate g is thin.

Further, the full-body thermal stress cleaving requires a large amount of heat, and hence, at the time of the localized heating, the contact state between the support member, such as the surface plate, and the glass substrate is extremely important, but in actuality, no appropriate measures have been taken from this point of view. In this case, the above-mentioned technology disclosed in Patent Literature 1 is not intended for the full-body thermal stress cleaving, and there is no significant need to take measures against the heat loss at the time of the localized heating. Therefore, the manner of supporting the glass substrate disclosed in Patent Literature 1 is not intended to solve the problem described above.

Specifically, in the technology disclosed in this literature, the support member is separately provided as the first stage and the second stage, and in order to apply a compressive stress and a tensile stress that are necessary to form the scribe line on the preset cleaving line of the glass substrate, the second stage is configured to move close to the first stage by a relative movement distance of 10 μm or more and 100 μm or less, and to move apart from the first stage by a relative movement distance of 10 μm or more and 50 μm or less.

Thus, the manner of supporting the glass substrate disclosed in this literature is not intended to enhance the thermal efficiency at the time of the localized heating of the glass substrate to an appropriate value, or even impart a sufficient temperature gradient for the full-body cutting. Therefore, the full-body thermal stress cutting of the glass substrate cannot be performed appropriately. Specifically, it is unclear whether or not this supporting manner is adaptable to the large amount of heat necessary for the full-body cleaving of the glass substrate, and further, the glass substrate cannot be cut unless the second stage moves close to and apart from the first stage. Thus, there arises such a critical problem that the support structure and therefore the support apparatus become complicated.

Note that, the above-mentioned problems or other similar problems may arise similarly to a case where fusing is performed on the glass substrate or the like.

In view of the above-mentioned circumstances, the present invention has a technical object to appropriately cut a glass sheet, such as a glass substrate and the like, by performing at least localized heating along a preset cutting line without causing complication of a support structure, decrease in productivity, and the like.

Solution to Problems

According to the present invention devised to achieve the above-mentioned technical object, there is provided a method of cutting a glass sheet by performing at least localized heating along a preset cutting line of the glass sheet, the method comprising cutting a full body of the glass sheet by performing at least the localized heating along the preset cutting line of the glass sheet under a state in which support members for supporting, from a back surface side of the glass sheet, portions of the glass sheet that are situated apart from the preset cutting line toward both sides thereof are arranged apart from each other so as to form a space on the back surface side of the preset cutting line. Note that, the "full-body cutting of the glass sheet" encompasses fusing of the glass sheet as well.

According to this structure, the portions of the glass sheet that are situated apart from the preset cutting line toward both sides thereof are supported by the support members from the back surface side, and during the support, the space is formed on the back surface side of the preset cutting line. Thus, when the full-body cutting is performed through the localized heating along the preset cutting line of the glass sheet, there is less influence of the support members on the heat. Specifically, a large amount of heat is necessary for the full-body cutting of the glass sheet utilizing the localized heating, and hence, when most of the heat is absorbed into the support members, the heat is wasted, further causing a trouble in achieving smooth full-body cutting. In view of this, in the present invention, the contact portions between support surfaces of the support members and the glass sheet are situated apart from the preset cutting line toward both sides thereof, and the space is formed between the two contact portions. Therefore, even when the localized heating is performed with a large amount of heat necessary for the full-body cutting, the heat absorption into the support members is suppressed to the extent possible. Thus, the glass sheet is cut under a state in which the thermal efficiency is enhanced, and due to a synergetic effect produced together with the full-body cutting, higher-speed processing is promoted, resulting in a significant advantage to obtain higher productivity and the like. In addition, even when a portion of the glass sheet in the vicinity of the preset cutting line is deformed due to a significant thermal gradient, there is no trouble in supporting the glass sheet from the fact that the space is provided on the back surface side. Thus, the full-body cutting can be performed along the preset cutting line with high accuracy, and the surface property of the cut surface becomes excellent. Moreover, in such full-body cutting as described above, there is no need to move both the support members close to and apart from each other, and hence the complication of the support structure or the support apparatus is avoided. Note that, it is preferred that the support surfaces of the support members be flat surfaces, and that the support surfaces be suction surfaces capable of sucking and holding the glass sheet through negative pressure suction or the like. Further, in a case where the glass sheet is a glass film having a thickness of, for example, 200 μm or less, a dimension of separation between the support members (dimension of the space in a width direction) is preferably 2 mm to 50 mm, more preferably 20 mm as an upper limit and 5 mm as a lower limit.

In this case, it is preferred that the cutting the full body of the glass sheet comprise forming an initial crack on the preset cutting line of the glass sheet, followed by propagating the initial crack due to a stress generated along with the localized heating along the preset cutting line and cooling of a heated region that is formed through the localized heating.

With this structure, as the heated region formed through the localized heating of the glass sheet and the cooled region corresponding to the heated region move in a scanning manner along the preset cutting line, the region in which the stress (thermal stress) is generated also moves along the preset cutting line. Thus, the initial crack propagates along the preset cutting line to cut the full body of the glass sheet. In such a cutting process, due to the above-mentioned manner of supporting the glass sheet, the temperature gradient caused by the heating and cooling can be secured sufficiently, and hence the full body of the glass sheet can be cut smoothly and appropriately while suppressing the waste of heat to the extent possible. Further, in a case of cutting a thin glass sheet having a thickness of, for example, 200 μm or less, that is, a glass film, the portion on the back surface of the glass sheet in the vicinity of the preset cutting line is brought into a non-contact state, and is not restrained by the suction or friction occurring on the support surfaces of the support members. Thus, the glass sheet may maximally expand through the localized heating, and maximally contract through the subsequent cooling. Further, a difference between the expansion and the contraction is a main factor in generating a tensile stress for the full-body cutting that involves the propagation of the initial crack, and hence the glass sheet can be cut (cleaved) by effectively utilizing the maximal distortion generated through the significantly efficient heating and cooling.

In the structure described above, the following method may be employed. Specifically, the glass sheet comprises a band-like glass sheet to be delivered continuously, the preset cutting line extends along a delivery direction of the band-like glass sheet, and the cutting the full body of the glass sheet comprises continuously cutting a full body of the band-like glass sheet along the preset cutting line.

With this structure, it is possible to perform the full-body cutting of the continuously delivered band-like glass sheet along the delivery direction thereof, which has conventionally been impossible. Therefore, unlike the conventional technology, there is no need to perform the cutting under a state in which the length of one side of the rectangular glass substrate is restricted, and hence the cutting efficiency is enhanced significantly. That is, such continuous cutting can be performed because the full-body cutting is performed in the above-mentioned supporting manner, resulting in an increase in variety of handling and usage of the glass sheet after the cutting.

Then, in a case of performing such continuous cutting, it is preferred that the support members be driven so as to deliver the band-like glass sheet continuously.

With this structure, the band-like glass sheet is delivered along with the drive of the support members for delivery, and hence sliding movement or the like is less liable to occur between the support members and the glass sheet, with the result that the risk of a scratch or the like of the glass sheet is eliminated, and the glass sheet is delivered stably. Thus, the glass quality is improved, and the cutting work can be performed at higher speed and in a smoother manner.

Further, in a case of performing such continuous cutting, the preset cutting line may be provided at a position for continuously separating the band-like glass sheet at an arbitrary portion in a width direction thereof.

With this structure, the band-like glass sheet can be separated at an arbitrary portion in the width direction (direction orthogonal to the delivery direction), and hence a plurality of band-like glass sheets having desired dimensions in the width direction can be obtained from the band-like glass sheet that is formed to have a large dimension in the width direction. Thus, glass sheets having required widths can be manufactured rapidly and efficiently while enhancing the performance of forming the band-like glass sheet in the forming apparatus.

Still further, in a case of performing such continuous cutting, the preset cutting line may be provided at positions for continuously cutting off selvage portions formed at both ends of the band-like glass sheet in the width direction thereof.

With this structure, the work of cutting off the selvage portions that are unnecessary thick portions of the glass sheet can be performed continuously while maintaining sufficient efficiency of forming the band-like glass sheet in the forming apparatus. Thus, the work of cutting off the selvage portions can be performed efficiently and smoothly.

Yet further, in a case of performing the continuous cutting described above, the band-like glass sheet to be delivered continuously may comprise a band-like glass sheet after being cooled through an annealing zone of a forming apparatus.

With this structure, during the continuous delivery of the band-like glass sheet formed through a series of continuous forming steps that involve forming molten glass in the forming apparatus and cooling the resultant glass through the annealing zone, the full body of the glass sheet is continuously cut along with the localized heating. Thus, the steps of forming the band-like glass sheet in the forming apparatus and the full-body cutting of the glass sheet are performed as a series of continuous works, and the work efficiency is enhanced significantly. Note that, it is preferred that the forming apparatus be an apparatus capable of carrying out a downdraw method, in particular, an overflow downdraw method. However, a forming apparatus capable of carrying out a float method or the like is not excluded.

Yet further, in a case of performing such continuous cutting, the band-like glass sheet to be delivered continuously may be rolled into a roll shape around a roll core while the full body of the band-like glass sheet is being continuously cut along the preset cutting line.

With this structure, as described above, the band-like glass sheet after cutting off the selvage portions or each of the band-like glass sheets after being separated so that the dimensions in the width direction become desired dimensions is rolled into a roll shape around the roll core. Thus, particularly a band-like thin glass sheet, that is, a glass film can easily be stored and packed into a compact shape. Note that, in this rolling process, it is preferred that the band-like glass sheet be rolled into a roll shape while overlaying a band-like protective sheet (for example, organic resin film) on the band-like glass sheet from the viewpoint of preventing a flaw that may be generated due to the contact between portions of the glass sheet. Further, it is preferred that the band-like glass sheets after being separated in the width direction be rolled into a roll shape around different roll cores while delivering the band-like glass sheets in different directions.

Yet further, in the structure described above, retaining members may be arranged on a front surface side of the glass sheet so as to be opposed to the support members, respectively, the retaining members being configured to sandwich the glass sheet between the retaining members and the support members.

With this structure, even when the glass sheet takes a vertical posture as well as a flat posture, the full-body cutting can be performed along with the localized heating under a state in which the glass sheet is sandwiched and held between the support members and the retaining members, with the result that appropriate cutting may be performed irrespective of the posture of the glass sheet. Note that, in this case, the retaining members may be substantially the same members and have substantially the same structure as the support members.

In the structure described above, it is preferred that an organic layer be interposed between the back surface of the glass sheet and the support surface of each of the support members. Also in the case of using the retaining members, it is preferred that the organic layer be interposed between the front surface of the glass sheet and a retaining surface of each of the retaining members. In this case, the above-mentioned "organic layer" encompasses an organic film (for example, organic resin film).

With this structure, due to the organic layer, thermal conduction to the support members and the retaining members is suppressed at the time of the localized heating along the preset cutting line of the glass sheet, and a flaw that may be generated along with the contact between the glass sheet and the support members and between the glass sheet and the retaining members is avoided.

In the structure described above, it is preferred that the glass sheet have a thickness of 200 μm or less.

Specifically, in a case of a thin glass sheet having a thickness of 200 μm or less, that is, a glass film, it is difficult to prevent the glass sheet from shattering, for example, when forming a scribe by rotating a wheel cutter at a small pressing force. Further, when the pressing force of the above-mentioned wheel cutter becomes larger than necessary, microcracks that cause decrease in strength of the cut end surface are easily formed in the horizontal direction in addition to a vertical crack that is necessary for snapping. In addition, in a case of performing the snapping along the preset cutting line extending in the longitudinal direction while rolling the glass film having a thickness of 200 μm or less into a roll shape, the scribe needs to be formed over a long distance, and hence the work becomes troublesome and difficult inevitably. As described above, the problems arising in the case of performing the snapping by forming the scribe in the glass film having a thickness of 200 μm or less can be solved all at once by the above-mentioned method according to the present invention. As a result, the thin glass film of this type can be obtained with high bending strength and high quality. Note that, the thickness of the glass film is preferably 100 μm or less, more preferably 50 μm or less.

In the structure described above, it is preferred that the localized heating be performed through use of a carbon dioxide laser.

As described above, when the carbon dioxide laser is used as localized heating means for the preset cutting line of the glass sheet, the glass (in particular, alkali-free glass) can absorb the energy of the laser efficiently. Thus, the localized heating can be performed in a simple manner under a stable state, and the cost is reduced as well.

When using the method described above, a glass sheet having a thickness of 200 μm or less may be obtained by cutting at least one side thereof.

The glass sheet, that is, the glass film has high bending strength of the cut surface thereof, and can therefore withstand a large tensile stress that is generated due to, for example, bending at a small curvature radius. Thus, the glass sheet can be used in a wider range and handled more easily as compared to the conventional glass sheet.

When using the method described above, a glass sheet having a bending strength of a cut surface of 200 MPa or more and a thickness of 200 μm or less may be obtained by cutting at least one side thereof.

The glass sheet, that is, the glass film has the bending strength of the cut surface of 200 MPa or more, and can therefore securely withstand a large tensile stress that is generated due to, for example, bending at a smaller curvature radius. In addition, the bending strength is clearly described as high as 200 MPa or more, and hence the glass sheet can be handled in a specific and appropriate manner.

Yet further, when using the method described above, a glass sheet roll may be obtained by rolling a glass sheet into a roll shape around a roll core.

According to this glass sheet roll, the storage and the handling are facilitated, and the transportation efficiency is also enhanced. Note that, in a case of performing the full-body cutting along the preset cutting line extending in the longitudinal direction while executing a method of drawing the band-like glass sheet from one glass sheet roll and synchronously rolling the band-like glass sheet into a roll shape around another roll core (roll-to-roll), the process may be carried out smoothly and easily.

Yet further, a glass sheet obtained by the method described above may comprise an organic layer formed on at least one of a front surface, a back surface, and a cut surface thereof.

Specifically, when the organic layer is formed on the front surface, the back surface, and the cut surface of the obtained glass sheet, the strengths of the front surface, the back surface, and the cut surface are enhanced, and hence, for the glass sheet having a thickness of, for example, 200 μm or less, that is, the glass film, a sufficient strength can be secured against deflection, with the result that the flexibility of the thin glass sheet can be utilized effectively.

According to the present invention devised to achieve the above-mentioned technical object, there is provided an apparatus for cutting a glass sheet, the apparatus comprising: heating means for performing localized heating along a preset cutting line of the glass sheet; and support members for supporting, from a back surface side of the glass sheet, portions of the glass sheet that are situated apart from the preset cutting line toward both sides thereof, the support members being arranged apart from each other so as to form a space on the back surface side of the preset cutting line, the apparatus being configured to cut a full body of the glass sheet by performing at least the localized heating by the localized heating means along the preset cutting line of the glass sheet that is supported by the support members.

The descriptions including those of the actions and effects of the apparatus having this structure are substantially the same as the descriptions of the above-mentioned method according to the present invention, which includes substantially the same structural elements as this apparatus.

The apparatus may further comprise: crack forming means for forming an initial crack on the preset cutting line of the glass sheet; and cooling means for cooling a heated region that is formed through the localized heating by the localized heating means, in which the apparatus is configured to cut the full body of the glass sheet by propagating the initial crack due to a stress generated by the localized heating means and the cooling means.

The descriptions including those of the actions and effects of the apparatus having this structure are also substantially the same as the descriptions of the above-mentioned method according to the present invention, which includes substantially the same structural elements as this apparatus.

Advantageous Effects of Invention

As described above, according to the present invention, the contact portions between the support surfaces of the support members and the glass sheet are situated apart from the preset cutting line toward both sides thereof, and the space is formed between the two contact portions. Therefore, even when the localized heating is performed with a large amount of heat necessary for the full-body cutting along the preset cutting line, the heat absorption into the support members is suppressed to the extent possible. Thus, the glass sheet is cut under a state in which the thermal efficiency is enhanced, and due to the synergetic effect produced together with the full-body cutting, higher-speed processing is promoted, resulting in a significant advantage to obtain higher productivity and the like. In addition, even when a portion of the glass sheet in the vicinity of the preset cutting line is deformed due to a significant thermal gradient, there is no trouble in supporting the glass sheet from the fact that the space is provided on the back surface side. Thus, the full-body cutting can be performed along the preset cutting line with high accuracy, and the surface property of the cut surface becomes excellent. Moreover, in such full-body cutting as described above, there is no need to move both the support members close to and apart from each other, and hence the complication of the support structure or the support apparatus is avoided.

DESCRIPTION OF EMBODIMENTS

Embodiments of the present invention are hereinafter described with reference to the accompanying drawings. Note that, in the following embodiments, an object to be cleaved is assumed as a glass sheet having a thickness of 200 μm or less, which is to be used for a FPD, an organic light-emitting diode illumination device, or a solar cell, that is, a glass film.

Figure 1:
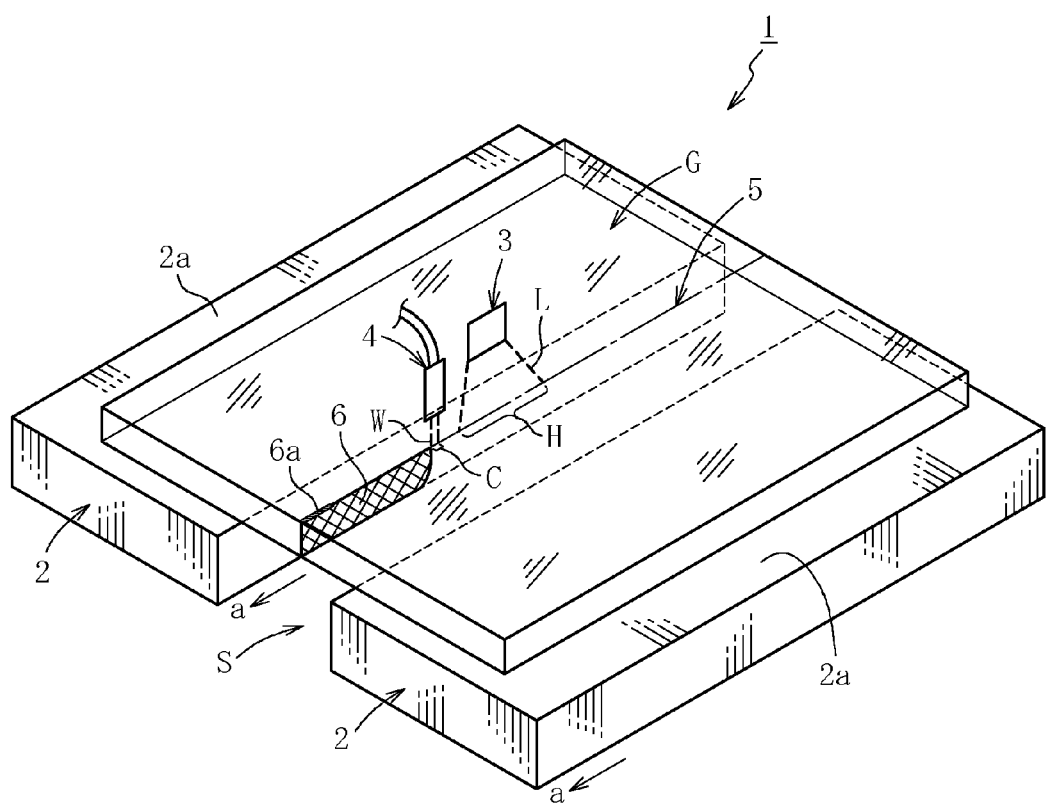
FIG. 1 A schematic perspective view illustrating a practical situation of a cutting apparatus for a glass sheet and a cutting method therefor according to a first embodiment of the present invention.

FIG. 1 is a schematic perspective view illustrating a practical situation of a cutting apparatus for a glass sheet and a cutting method therefor according to a first embodiment of the present invention, which defines a basic structure of the present invention. As illustrated in FIG. 1, a cutting apparatus 1 according to the first embodiment comprises a pair of support members 2 arranged apart from each other, localized heating means 3 for performing localized heating by radiating a laser beam L onto a glass sheet G, which is placed in a manner of bridging support surfaces 2a of the support members 2, from a front surface side of the glass sheet G, and cooling means 4 for jetting cooling water W to a heated region H, which is formed through the heating by the localized heating means 3, from the front surface side. In this case, the pair of support members 2 is formed of a rectangular parallelepiped surface plate or a member equivalent thereto. In this embodiment, a carbon dioxide laser is used as the localized heating means 3, but there may be used other means capable of performing the localized heating, such as an electrical heating wire and hot air blast. Further, the cooling means 4 is configured to jet the cooling water W as a coolant due to an air pressure or the like, and this coolant may be, for example, a cooling liquid other than the cooling water, a gas such as an air and an inert gas, a mixture of a gas and a liquid, or further, a mixture of a solid, such as ice and dry ice, and the gas and/or the liquid.

The pair of support members 2 supports, from a back surface side of the glass sheet G, portions of the glass sheet G that are situated apart by the same dimension from a preset cutting line 5 toward both sides thereof. Further, a space S is provided on the back surface side of the preset cutting line 5 of the glass sheet G, and the glass sheet G is held on the support surfaces 2a of both the support members 2 through negative pressure suction or the like so as not to move relative to the support surfaces 2a. In this embodiment, the pair of support members 2 is movable at the same speed in the arrow "a" direction (direction along the preset cutting line 5), and the localized heating means 3 and the cooling means 4 are held in a fixed manner. Alternatively, the pair of support members 2 may be held in a fixed manner, and the localized heating means 3 and the cooling means 4 may be set movable.

As for the heated region H formed through the laser irradiation by the localized heating means 3 and a cooled region C formed through the cooling water jetting by the cooling means 4, the heated region H scans the preset cutting line 5 from one end portion side of the glass sheet G while moving ahead of the cooled region C. In this case, crack forming means (crack imparting means) (not shown) forms an initial crack 6a in advance on the preset cutting line 5 at one end portion of the glass sheet G, and hence the initial crack 6a propagates due to a stress (thermal stress) generated at the time of scanning movement of the heated region H and the cooled region C described above. Thus, a cut surface 6 passing through the glass sheet G from the front surface to the back surface is formed on the preset cutting line 5 while propagating along the preset cutting line 5. In this manner, the glass sheet G is subjected to full-body cutting (full-body thermal stress cleaving) along the preset cutting line 5.

In the cutting process as described above, the contact portions between the support surfaces 2a of the support members 2 and the glass sheet G are situated apart from each other by 10 to 20 mm on the back surface side of the preset cutting line 5, and the space S is formed between the two contact portions. Therefore, even when the localized heating is performed with a large amount of heat necessary for the full-body cutting along the preset cutting line 5, thermal conduction to the support members 2 is suppressed to the extent possible. Thus, the glass sheet G is cut under a state in which the thermal efficiency is enhanced, and due to a synergetic effect produced together with the full-body cutting, higher-speed processing is promoted, resulting in a significant advantage to obtain higher productivity and the like. In addition, even when a portion of the glass sheet G in the vicinity of the preset cutting line 5 is deformed due to a significant thermal gradient, there is no trouble in supporting the glass sheet G from the fact that the space S is provided on the back surface side. Thus, the glass sheet G can be cut along the preset cutting line 5 with high accuracy, and the surface property of the cut surface 6 becomes excellent. Moreover, in such full-body cutting as described above, there is no need to move the pair of support members 2 close to and apart from each other, and hence the complication of the support structure and therefore the support apparatus is avoided. Further, in a case of cutting a thin glass sheet G having a thickness of, for example, 200 μm or less, the portion on the back surface of the glass sheet G in the vicinity of the preset cutting line 5 is brought into a non-contact state, and is not restrained by the suction or friction occurring on the support surfaces 2a of the support members 2. Thus, the glass sheet G may maximally expand through the localized heating, and maximally contract through the subsequent cooling. Further, a difference between the expansion and the contraction is a main factor in generating a tensile stress for the full-body cutting that involves the propagation of the initial crack 6a, and hence the glass sheet G can be cleaved by effectively utilizing the maximal tensile stress generated through the significantly efficient heating and cooling.

Note that, it is preferred that an organic layer (for example, organic resin film) be interposed between each support member 2 and the glass sheet G from the viewpoint of preventing a flaw in the glass sheet G due to the contact therebetween. Further, referring to FIG. 1, the initial crack 6a is formed at one end portion of the preset cutting line 5 on the front surface of the glass sheet G, but this initial crack 6a may be formed through the end surface starting from one end portion on the front surface of the glass sheet G.

Figure 2:
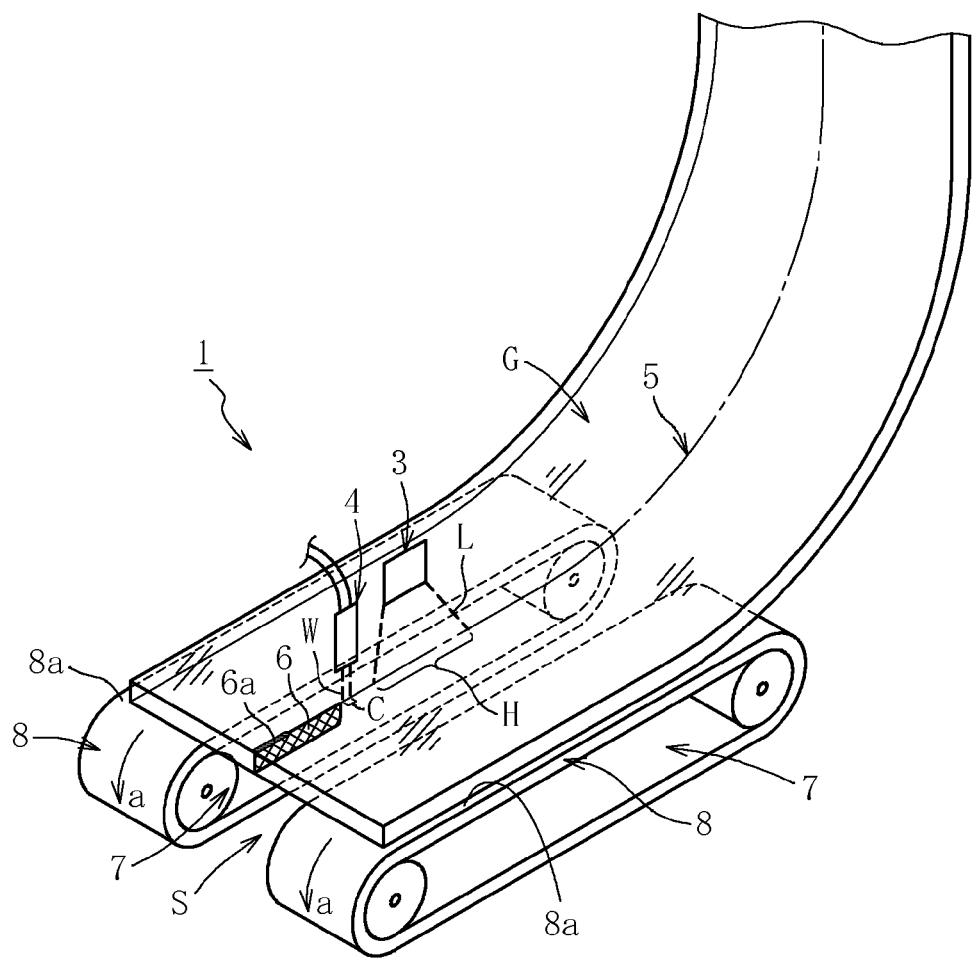
FIG. 2 A perspective view illustrating a main part of a practical situation of a cutting apparatus for a glass sheet and a cutting method therefor according to a second embodiment of the present invention.

FIG. 2 is a perspective view illustrating a main part of a practical situation of a cutting apparatus for a glass sheet and a cutting method therefor according to a second embodiment of the present invention. As illustrated in FIG. 2, a cutting apparatus 1 according to the second embodiment comprises a pair of support members formed of conveyance belts 8 of conveyors 7 (may be formed of a plurality of conveyance rollers of roller conveyors), respectively. Those conveyance belts 8 are driven at the same speed in the arrow "a" direction so as to deliver a band-like glass sheet G in a direction along a preset cutting line 5. Outer peripheral surfaces of those conveyance belts 8 are set as support surfaces 8a for holding the band-like glass sheet G through suction or the like, and the conveyance belts 8 support, from the bottom, portions of the band-like glass sheet G that are situated apart from the preset cutting line 5 provided at a center portion of the band-like glass sheet G in its width direction toward both sides thereof. Further, a space S is formed on a back surface side of the preset cutting line 5 of the band-like glass sheet G in a region over the entire longitudinal length of each conveyor 7. In addition, at a position above the preset cutting line 5 of the band-like glass sheet G, the cutting apparatus 1 comprises localized heating means 3 for performing localized heating with a laser beam L, and cooling means 4 for jetting and supplying cooling water W. In the structure as described above, the conveyance belts 8 of the conveyors 7 deliver the band-like glass sheet G so that a heated region H formed by the localized heating means 3 scans the preset cutting line 5 of the band-like glass sheet G from one end portion side thereof while moving ahead of a cooled region C formed by the cooling means 4. Thus, an initial crack 6a formed at one end portion of the band-like glass sheet G propagates so that a cut surface 6 passing through the band-like glass sheet G from the front surface to the back surface is formed on the preset cutting line 5. Along with this formation, full-body cutting (full-body thermal stress cleaving) is performed continuously. Other structures, actions, effects, and supplementary descriptions are the same as those in the first embodiment described above, and hence descriptions thereof are therefore omitted herein and common structural elements are represented by the same reference symbols.

Figure 3:
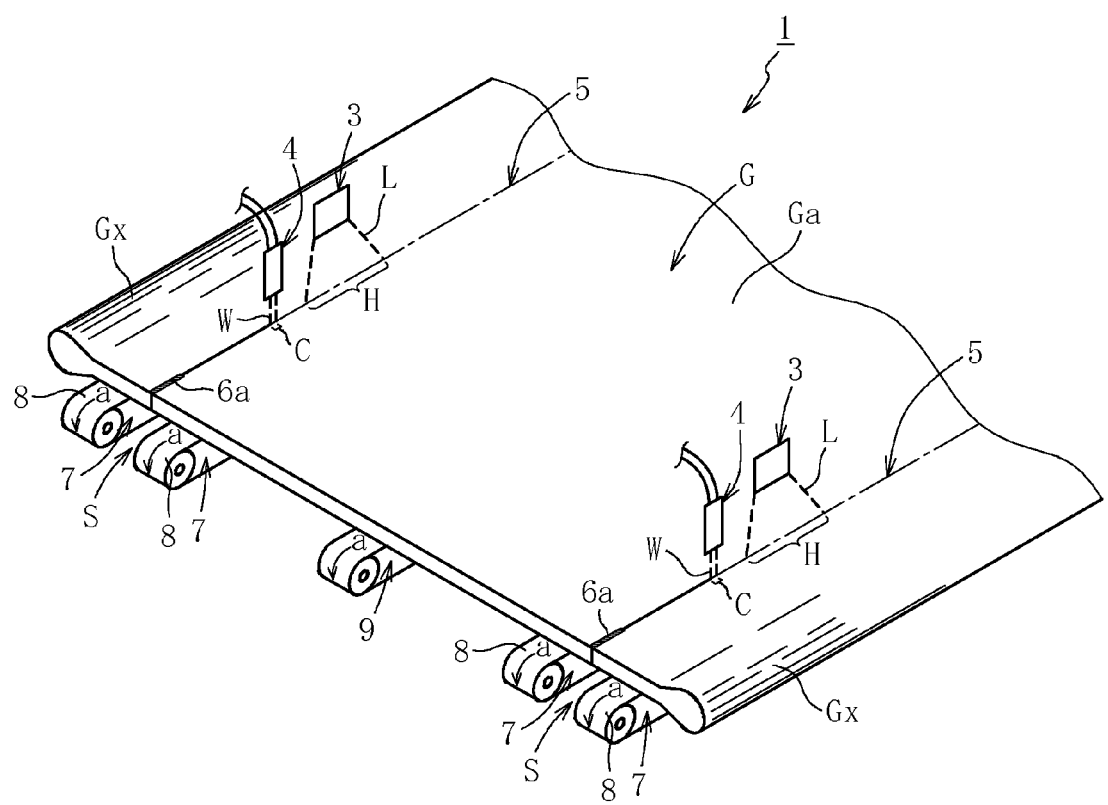
FIG. 3 A perspective view illustrating a main part of a practical situation of a cutting apparatus for a glass sheet and a cutting method therefor according to a third embodiment of the present invention.

FIG. 3 is a perspective view illustrating a main part of a practical situation of a cutting apparatus for a glass sheet and a cutting method therefor according to a third embodiment of the present invention. As illustrated in FIG. 3, a cutting apparatus 1 according to the third embodiment is configured to cut off relatively thick selvage portions Gx formed at both ends of a band-like glass sheet G in the width direction, and preset cutting lines 5 are provided at positions slightly shifted from those selvage portions Gx toward a center side in the width direction. Further, a pair of conveyors 7 for supporting and delivering the band-like glass sheet G from a back surface side thereof is arranged at portions that are situated apart from each preset cutting line 5 toward both sides thereof. In addition, a space S is provided on the back surface side of each preset cutting line 5. Further, on a front surface side of the band-like glass sheet G, there are arranged localized heating means 3 for performing localized heating on each preset cutting line 5, and cooling means 4 for jetting cooling water W. Note that, on the back surface side of a center region of the band-like glass sheet G in the width direction, there are installed one or more (in the example of FIG. 3, one) auxiliary conveyors 9 for preventing a slack of the band-like glass sheet G. Note that, when the dimension of the band-like glass sheet G in the width direction is small, the auxiliary conveyor 9 is not necessary, and further, of the two pairs of conveyors 7, two of the conveyors 7 arranged close to the center side in the width direction may be replaced with a single conveyor to be used in common, with the result that three conveyors 7 are arranged in total. In the structure as described above, during a period in which the conveyors 7 (and auxiliary conveyor 9) deliver the band-like glass sheet G, a heated region H formed by the localized heating means 3 and a cooled region C formed by the cooling means 4 scan each preset cutting line 5 so that the band-like glass sheet G is subjected to full-body cutting at a position between an available portion Ga and each selvage portion Gx along with propagation of an initial crack 6a. In this manner, each selvage portion Gx is cut off continuously. Other structures, actions, effects, and supplementary descriptions are the same as those in the first embodiment described above, and hence descriptions thereof are therefore omitted herein and common structural elements are represented by the same reference symbols.

Figure 4:
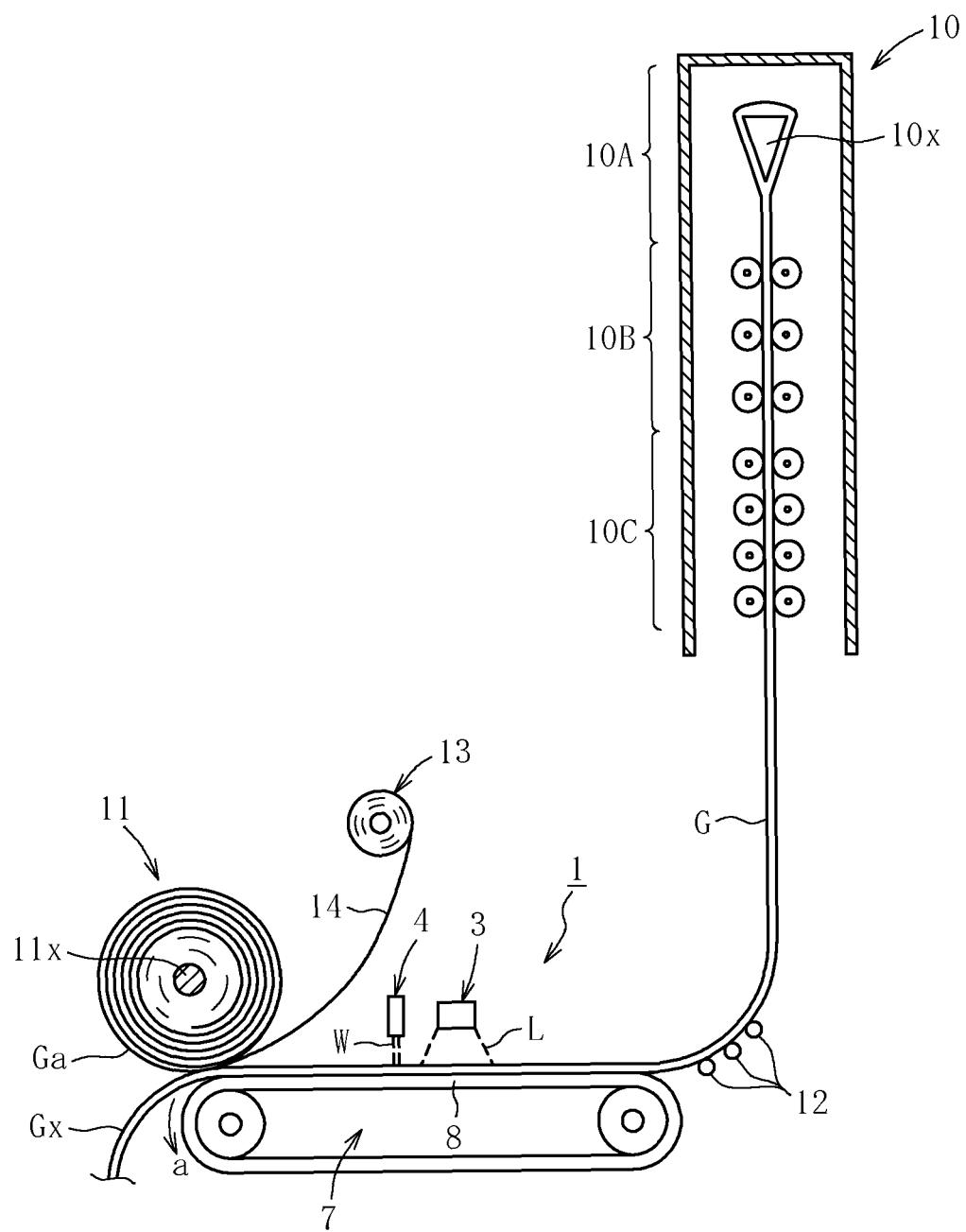
FIG. 4 A schematic side view illustrating a practical situation of a cutting apparatus for a glass sheet and a cutting method therefor according to a fourth embodiment of the present invention.

FIG. 4 is a schematic side view illustrating a practical situation of a cutting apparatus for a glass sheet and a cutting method therefor according to a fourth embodiment of the present invention. As illustrated in FIG. 4, in the fourth embodiment, the above-mentioned cutting apparatus 1 illustrated in FIG. 3 is interposed between a forming apparatus 10 for forming a band-like glass sheet G and a rolling apparatus 11 for rolling the formed band-like glass sheet G into a roll shape around a roll core 11a. Specifically, the forming apparatus 10 carries out an overflow downdraw method, and includes, in the following order from above, a forming zone 10A having a forming member 10x inside a forming furnace, an annealing zone 10B having annealing means (annealer), and a cooling zone 10C having cooling means. The band-like glass sheet G drawn downward from the cooling zone 10C of the forming apparatus 10 is conveyed in a lateral direction while being smoothly curved by conversion rollers 12 to be supported on the conveyance belts 8 of the conveyors 7 of the cutting apparatus 1 through suction or the like. During a period in which the band-like glass sheet G is thus supported and laterally delivered by the conveyance belts 8, the localized heating means 3 and the cooling means 4 perform localized heating and cooling on each preset cutting line 5 so that the band-like glass sheet G is subjected to full-body cutting at a position between an available portion Ga and each selvage portion Gx. After that, the available portion Ga of the glass sheet G is rolled into a roll shape around the roll core 11a of the rolling apparatus 11, and when the outer diameter of the roll becomes a predetermined value, the glass sheet G is cut in a width direction thereof. The glass sheet G is cut by, for example, snapping the glass sheet G along a scribe formed in the width direction of the glass sheet G with a cutter. As a result, a glass roll formed into a roll shape is obtained as a finished product. Note that, in this embodiment, a protective sheet roll 13 is arranged above the roll core 11a of the rolling apparatus 11, and a protective sheet 14 drawn from this protective sheet roll 13 is rolled into a roll shape around the roll core 11a under a state in which the protective sheet 14 is overlaid on a front surface side of the available portion Ga of the glass sheet G. On the other hand, the selvage portions Gx of the band-like glass sheet G are delivered downward and disposed of as a waste. In this case, the structures, actions, and effects of the cutting apparatus 1 are substantially the same as those in the third embodiment described above, and hence descriptions thereof are therefore omitted herein and common structural elements are represented by the same reference symbols.

Figure 5:
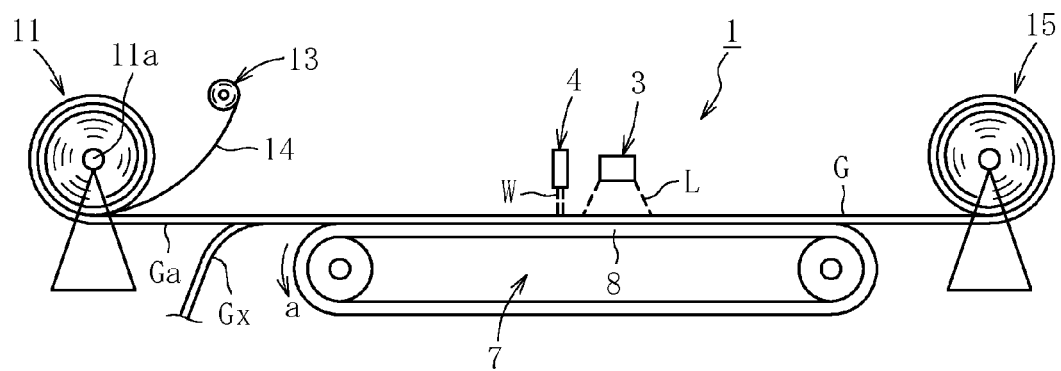
FIG. 5 A schematic side view illustrating a practical situation of a cutting apparatus for a glass sheet and a cutting method therefor according to a fifth embodiment of the present invention.

FIG. 5 is a schematic side view illustrating a practical situation of a cutting apparatus for a glass sheet and a cutting method therefor according to a fifth embodiment of the present invention. The fifth embodiment is different from the fourth embodiment described above in the following matter. Specifically, an original glass roll 15 is manufactured by rolling a band-like glass sheet G, which is drawn from the cooling zone 10C of the forming apparatus 10, into a roll shape without cutting off selvage portions Gx. Then, the band-like glass sheet G drawn from this original glass roll 15 is laterally delivered, and along with the delivery, the selvage portions Gx are cut off by the cutting apparatus 1. Through those steps, the band-like glass sheet G is rolled into a roll shape around the roll core 11a of the rolling apparatus 11, with the result that a glass roll is obtained as a finished product. In this case, the structure, actions, and effects of the cutting apparatus 1 that executes the step of cutting off the selvage portions Gx of the band-like glass sheet G are substantially the same as those of the cutting apparatus 1 according to the third embodiment described above, and hence descriptions thereof are therefore omitted herein and common structural elements are represented by the same reference symbols. Note that, also in the fifth embodiment, a protective sheet roll 13 is arranged above the roll core 11a of the rolling apparatus 11, and a protective sheet 14 drawn from this protective sheet roll 13 is rolled into a roll shape around the roll core 11a under a state in which the protective sheet 14 is overlaid on a front surface side of an available portion Ga of the glass sheet G. Thus, a glass roll is obtained as a finished product.

Figure 6:
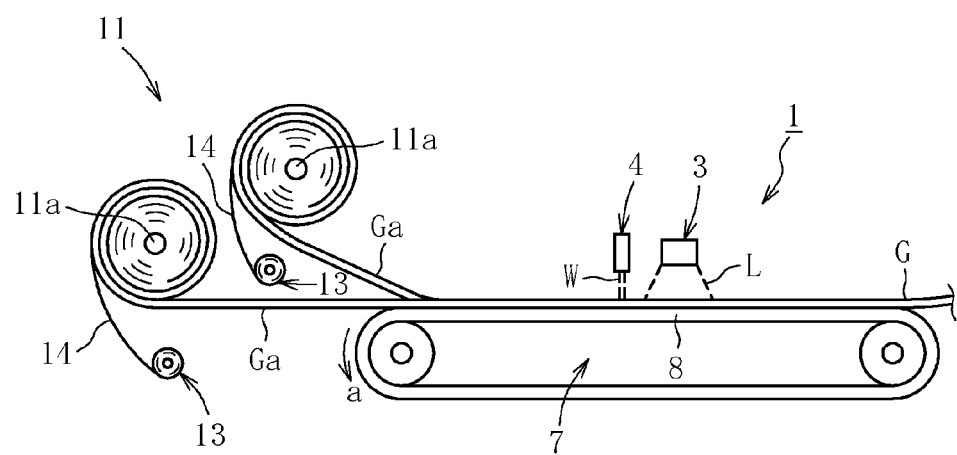
FIG. 6 A schematic side view illustrating a practical situation of a cutting apparatus for a glass sheet and a cutting method therefor according to a sixth embodiment of the present invention.

FIG. 6 is a schematic side view illustrating a practical situation of a cutting apparatus for a glass sheet and a cutting method therefor according to a sixth embodiment of the present invention. The sixth embodiment is different from the fourth embodiment or the fifth embodiment described above in the following matter. Specifically, a band-like glass sheet G drawn from the cooling zone 10C of the forming apparatus 10 or from the original glass roll 15 is laterally delivered, and along with the delivery, selvage portions Gx of the glass sheet G are cut off. Then, the glass sheet G is further subjected to a two-way division step in the cutting apparatus 1, and is rolled into a roll shape around two roll cores 11a of the rolling apparatus 11, with the result that two glass rolls are obtained as finished products. In this case, the structure, actions, and effects of the cutting apparatus 1 that executes the two-way division step for the band-like glass sheet G are substantially the same as those of the cutting apparatus 1 according to the second embodiment described above, and hence descriptions thereof are therefore omitted herein and common structural elements are represented by the same reference symbols. Note that, in the sixth embodiment, a protective sheet 14 drawn from each protective sheet roll 13 is rolled into a roll shape around the roll core 11a under a state in which the protective sheet 14 is overlaid on a back surface side of an available portion Ga of the glass sheet G.

Figure 7:
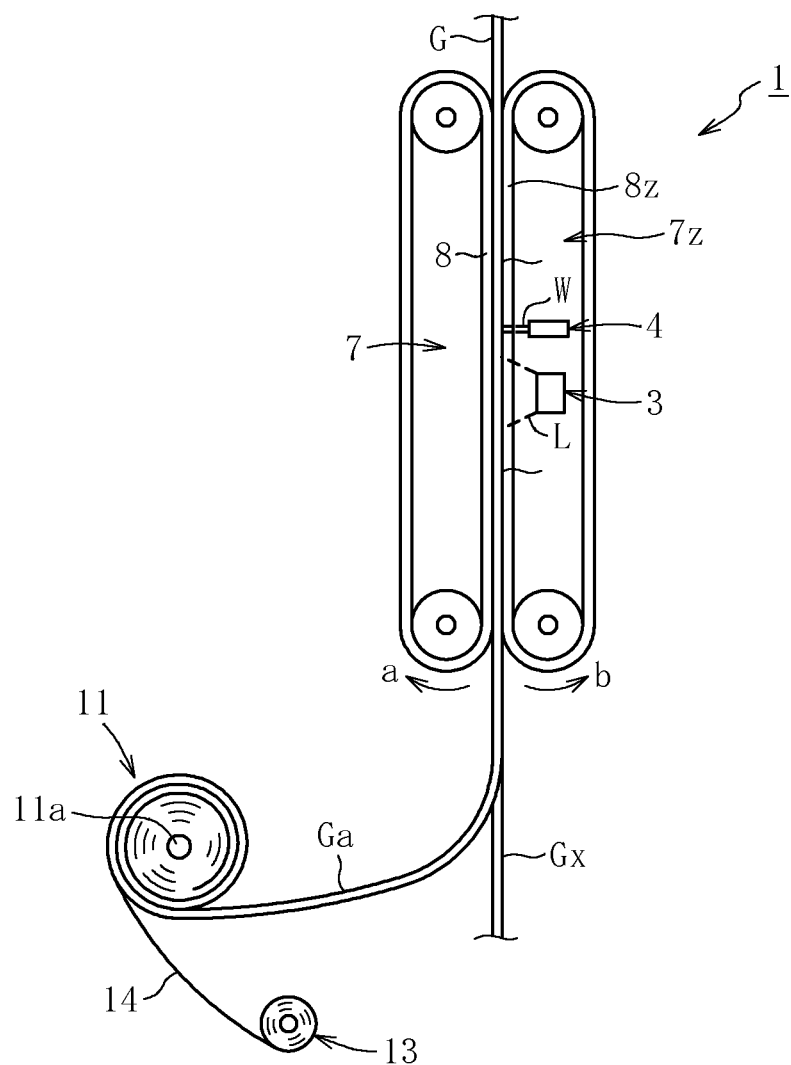
FIG. 7 A schematic side view illustrating a practical situation of a cutting apparatus for a glass sheet and a cutting method therefor according to a seventh embodiment of the present invention.

FIG. 7 is a schematic side view illustrating a practical situation of a cutting apparatus for a glass sheet and a cutting method therefor according to a seventh embodiment of the present invention. A cutting apparatus 1 according to the seventh embodiment is different from those in the second to sixth embodiments described above in the following matter. Basically, a band-like glass sheet G is supported in a state of being sandwiched by conveyance belts 8 serving as support members of conveyors 7 on one side, and by conveyance belts 8z serving as retaining members of conveyors 7z on another side. As another difference, the band-like glass sheet G is delivered downward in a vertical posture. Thus, the structure of the conveyance belts 8 serving as the support members is substantially the same as that of the conveyance belts 8z serving as the retaining members, and both the conveyance belts 8 and 8z are arranged to be opposed to each other and driven for delivery at the same speed in the "a" direction and the "b" direction, respectively. Note that, in such an embodiment that the conveyance belts 8z serving as the retaining members are brought into contact with an available portion Ga of the band-like glass sheet G, it is preferred that an organic film (for example, organic resin film) be interposed between the conveyance belts 8z and the band-like glass sheet G. The structure for full-body cutting of the band-like glass sheet G by the above-mentioned cutting apparatus 1, and actions and effects produced from this structure are substantially the same as those in the second to sixth embodiments described above, and hence descriptions thereof are therefore omitted herein and common structural elements are represented by the same reference symbols. Note that, the posture of the band-like glass sheet G is not particularly limited, and may be a flat posture (horizontal posture). Further, this structure is applicable to a case where a longitudinal center line of the glass sheet G is inclined from the horizontal direction.

Figure 8:
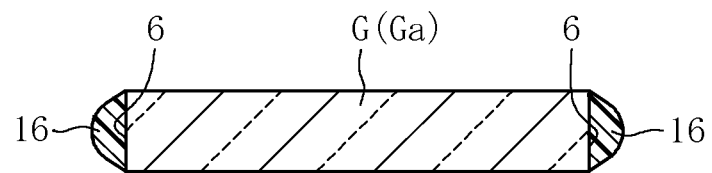
FIG. 8 A sectional view illustrating a state in which an organic layer is formed on a cut surface of a glass sheet that is cut by the cutting apparatus according to the first to seventh embodiments of the present invention.

FIG. 8 illustrates that an organic layer (preferably an organic resin layer) 16 is formed on the cut surface 6 of the glass sheet G (Ga) that is cut by the cutting apparatus 1 according to each of the embodiments described above. Note that, in the example of FIG. 8, the cut surfaces 6 are provided at both ends of the glass sheet G (Ga) in the width direction, and hence the organic layers 16 are formed at both the ends, but when the cut surface 6 is provided only at one end of the glass sheet G (Ga) in the width direction, the organic layer 16 may be formed only at the one end. With this structure, the strength of the cut surface 6 of the glass sheet G is enhanced, and hence, for a glass sheet G having a thickness of 200 μm or less, a sufficient strength can be secured against deflection, with the result that the flexibility of the thin glass sheet G can be utilized effectively.

Figure 9:
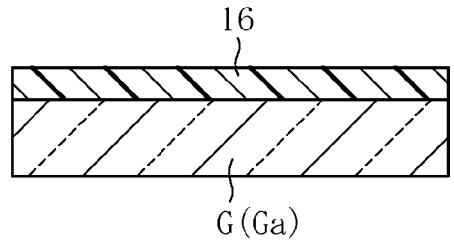
FIG. 9 A sectional view illustrating a state in which the organic layer is formed on a front surface of the glass sheet that is cut by the cutting apparatus according to the first to seventh embodiments of the present invention.

FIG. 9 illustrates that the organic layer (preferably an organic resin layer) 16 is formed on the front surface of the glass sheet G (Ga) that is cut by the cutting apparatus 1 according to each of the embodiments described above. Also in this case, the strength of the front surface of the glass sheet G (Ga) is enhanced, and hence a sufficient strength can be secured against deflection, with the result that the flexibility of the thin glass sheet G (Ga) can be utilized effectively.

In the embodiments described above, the glass sheet G is subjected to the full-body cutting through the so-called thermal stress cleaving, but the present invention is similarly applicable to a case where the glass sheet G is subjected to the full-body cutting through fusing.

EXAMPLES

Figure 10:
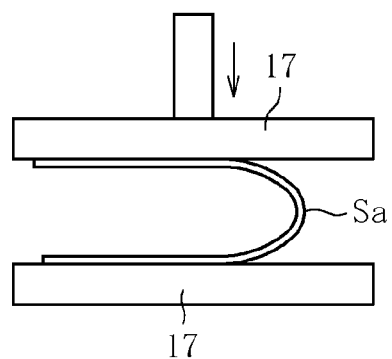
FIG. 10 A schematic view illustrating a state of carrying out evaluation of the glass sheet.
Figure 11A:
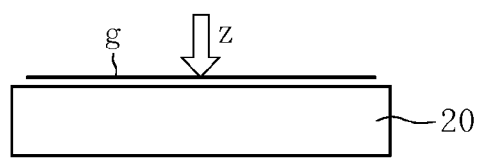
FIG. 11a A schematic front view illustrating a problem inherent in a conventional technology.
Figure 11B:
FIG. 11b A schematic front view illustrating the problem inherent in the conventional technology.
Figure 11C:
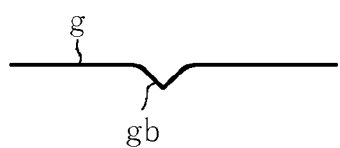
FIG. 11c A schematic front view illustrating the problem inherent in the conventional technology.

In [Example 1] of the present invention, an alkali-free glass sheet having a long side of 460 mm, a short side of 360 mm, a thickness of 200 μm, and a thermal expansion coefficient of $38 \times 10^{-7}/°$ C. was placed on support surfaces of a pair of support members, which was formed of stainless workbenches arranged with a space of 20 mm wide on a back surface side of a preset cutting line, through an intermediation of foamed polyethylene sheets serving as organic layers (basically in the state illustrated in FIG. 1). Then, an initial crack was formed on the preset cutting line through use of, for example, a cemented carbide wheel tip, and then full-body cutting was performed at a speed of 200 mm/sec by irradiating the preset cutting line with an elliptical laser spot having a length of 20 mm and a width of 3 mm at a power of 60 w through use of a carbon dioxide laser serving as localized heating means, and subsequently spraying a coolant made from a mixture of an air and water as cooling means at an air pressure of 0.05 MPa and a water spray rate of 0.3 ml/min. The localized heating and cooling were repeatedly executed on portions at intervals of 15 mm in the width direction, to thereby manufacture 50 samples Sa each formed of a glass sheet having a width of 15 mm and a length of 360 mm. After that, as illustrated in FIG. 10, the strengths of those samples Sa were sequentially evaluated by two-point bending, in which each of the samples Sa was sandwiched between two plate-like members 17 and was pressed and bent into a U-shape in the longitudinal direction at a speed of 50 mm/min. This evaluation was carried out by calculating the fracture strength based on a distance between the two plate-like members 17 at the time when each of the samples Sa was broken due to the bending under pressure, and the fracture strength resulted in 200 MPa at the minimum and 500 MPa on average. This fracture strength resulted in at least three times as large an average as the fracture strength of an end surface obtained through snapping after a scribe was formed through use of a cemented carbide wheel tip as in Comparative Example 1 described later.

In [Example 2] of the present invention, an alkali-free glass sheet having a long side of 460 mm, a short side of 360 mm, a thickness of 50 μm, and a thermal expansion coefficient of $38 \times 10^{-7}/°$ C. was subjected to laser cleaving by the same method as that described above in Example 1 at a power of a carbon dioxide laser of 100 w and at a cutting speed of 700 mm/sec. As a result, through the full-body cutting, 50 samples Sa each formed of a glass sheet having a width of 15 mm and a length of 360 mm were manufactured. Those samples Sa were also sequentially evaluated by the same method as that described above in Example 1. As a result, the fracture strength was 220 MPa at the minimum and 600 MPa on average, and was at least three times as large an average as the fracture strength obtained in Comparative Example 1 described later.

In [Example 3] of the present invention, an alkali-free glass sheet having a long side of 460 mm, a short side of 360 mm, a thickness of 100 μm, and a thermal expansion coefficient of $38 \times 10^{-7}/°$ C. was subjected to laser cleaving by the same method as that described above in Example 1 at a power of a carbon dioxide laser of 40 w and at a cutting speed of 150 mm/sec. As a result, through the full-body cutting, 50 samples Sa each formed of a glass sheet having a width of 15 mm and a length of 360 mm were manufactured. Then, the cut surface extending along the longitudinal direction of each of the samples Sa was coated with an ultraviolet curable acrylic resin at a thickness of 10 μm, followed by irradiation through use of a high-pressure mercury vapor lamp at a power of 100 W for one minute, to thereby cure the ultraviolet curable resin. After the ultraviolet curable resin was cured, a flaw was generated on the ultraviolet curable resin at a load of 1 N through use of sandpaper #2000, and evaluation was thereafter carried out by the same method as that described above in Example 1. As a result, the fracture strength was 200 MPa at the minimum and 530 MPa on average, and the strength of the cut surface was not decreased.

In [Example 4] of the present invention, a band-like glass sheet made of alkali-free glass having a length of 250 m, a width of 600 mm, a thickness of 100 μm, and a thermal expansion coefficient of $38 \times 10^{-7}/°$ C. was rolled around a roll core to manufacture a glass roll. After that, during a period in which the band-like glass sheet was drawn from the glass roll, both ends in the width direction were each cut off by 50 mm in substantially the same manner as that described above with reference to FIG. 3. Then, the resultant band-like glass sheet having a width of 500 mm was newly rolled around an acrylic roll core having a diameter of 100 mm under a state in which a PET film having a width of 550 mm and a thickness of 20 μm was overlaid on the band-like glass sheet. The band-like glass sheet thus rolled was sampled to carry out evaluation by the same method as that described above in Example 1. As a result, the fracture strength was 210 MPa at the minimum and 515 MPa on average, and was at least three times as large an average as the fracture strength obtained in Comparative Example 1 described later.

In [Example 5] of the present invention, an alkali-free glass sheet having a long side of 460 mm, a short side of 360 mm, a thickness of 300 μm, and a thermal expansion coefficient of $38 \times 10^{-7}/°$ C. was subjected to laser cleaving by the same method as that described above in Example 1 at a power of a carbon dioxide laser of 10 to 200 w and at a cutting speed of 50 mm/sec to 700 mm/sec. As a result, it was found that the full-body cutting was difficult due to the large thickness of the alkali-free glass sheet. However, the full-body cutting could be performed if the power of the carbon dioxide laser and the cutting speed were adjusted.

In [Comparative Example 1], an alkali-free glass sheet having a long side of 460 mm, a short side of 360 mm, a thickness of 50 µm, and a thermal expansion coefficient of $38 \times 10^{-7}/°$ C. was placed on a single surface plate. Further, scribes were formed in the glass sheet at intervals of 15 mm wide, a pressing force of 2 N, and a speed of 50 mm/sec through use of a cemented carbide wheel tip having a wedge angle of 95°, and then snapping was carried out manually. In this manner, 50 samples Sa were obtained, but 10 pieces out of those 50 samples Sa had horizontal cracks propagated in every direction during the scribe formation, and thus the sampling was substantially impossible for those 10 pieces. The remaining 40 pieces were evaluated by the same method as that described above in Example 1. As a result, the fracture strength exhibited such extremely small values as 60 MPa at the minimum and 130 MPa on average.

REFERENCE SIGNS LIST 1 cutting apparatus
2 support member
2a support surface
3 localized heating means
4 cooling means
5 preset cutting line
6 cut surface
6a initial crack
8 conveyance belt (support member)
8a support surface
10 forming apparatus
11 rolling apparatus
11a roll core
14 protective sheet
G glass sheet (glass film)
Ga available portion
Gx selvage portion
H heated region
C cooled region

The invention claimed is:

1. A method of cutting a glass sheet by performing at least localized heating along a preset cutting line of the glass sheet,
the method comprising cutting a full body of the glass sheet by performing at least the localized heating along the preset cutting line of the glass sheet under a state in which support members for supporting, from a back surface side of the glass sheet, portions of the glass sheet that are situated apart from the preset cutting line on both sides thereof are arranged apart from each other so as to form a space between the support members on the back surface side of the glass sheet at a position where the preset cutting line is located,
wherein the glass sheet comprises a band-like glass sheet to be delivered continuously, the glass sheet having a thickness of 200 µm or less,
wherein the preset cutting line extends along a delivery direction of the band-like glass sheet,
and wherein the band-like glass sheet to be delivered continuously is rolled into a roll shape around a roll core while the full body of the band-like glass sheet is being cut continuously by being locally heated from a front surface side of the glass sheet at a same position along the delivery direction where the space is formed on the back surface side of the glass sheet.

2. The method of cutting a glass sheet according to claim 1, wherein the cutting of the full body of the glass sheet comprises forming an initial crack on the preset cutting line of the glass sheet, followed by propagating the initial crack due to a stress generated along with the localized heating along the preset cutting line and cooling of a heated region that is formed through the localized heating.

3. The method of cutting a glass sheet according to claim 1, wherein the support members are driven so as to deliver the band-like glass sheet continuously.

4. The method of cutting a glass sheet according to claim 1, wherein the preset cutting line is provided at a position for continuously separating the band-like glass sheet at an arbitrary portion in a width direction thereof.

5. The method of cutting a glass sheet according to claim 1, wherein the preset cutting line is provided at positions for continuously cutting off selvage portions formed at both ends of the band-like glass sheet in the width direction thereof.

6. The method of cutting a glass sheet according to claim 1, wherein the band-like glass sheet to be delivered continuously comprises a band-like glass sheet to be delivered after being cooled through an annealing zone of a forming apparatus.

7. The method of cutting a glass sheet according to claim 1, wherein retaining members are arranged on the front surface side of the glass sheet so as to be opposed to the support members, respectively, the retaining members being configured to sandwich the glass sheet between the retaining members and the support members.

8. The method of cutting a glass sheet according to claim 7, wherein an organic layer is interposed between the front surface of the glass sheet and a retaining surface of each of the retaining members.

9. The method of cutting a glass sheet according to claim 1, wherein an organic layer is interposed between the back surface of the glass sheet and a support surface of each of the support members.

10. The method of cutting a glass sheet according to claim 1, wherein the localized heating is performed through use of a carbon dioxide laser.

* * * * *